United States Patent
Lee

(10) Patent No.: US 10,415,602 B2
(45) Date of Patent: Sep. 17, 2019

(54) CAVITATION PUMP UNIT

(71) Applicant: ORP Innovation LLC, Tenafly, NJ (US)

(72) Inventor: Jacob B. Lee, Tenafly, NJ (US)

( * ) Notice: Subject to any disclaimer, the term of this patent is extended or adjusted under 35 U.S.C. 154(b) by 276 days.

(21) Appl. No.: 15/471,227

(22) Filed: Mar. 28, 2017

(65) Prior Publication Data
US 2018/0209448 A1    Jul. 26, 2018

(30) Foreign Application Priority Data
Jan. 24, 2017    (KR) .................. 10-2017-0010777

(51) Int. Cl.
| F04D 29/70 | (2006.01) |
| F04D 29/18 | (2006.01) |
| C02F 1/34 | (2006.01) |
| F04D 3/00 | (2006.01) |
| F04D 7/04 | (2006.01) |
| F04D 13/06 | (2006.01) |
| C02F 103/20 | (2006.01) |

(52) U.S. Cl.
CPC .............. F04D 29/708 (2013.01); C02F 1/34 (2013.01); F04D 3/00 (2013.01); F04D 7/045 (2013.01); F04D 29/185 (2013.01); *C02F 2103/20* (2013.01); *C02F 2303/26* (2013.01); *F04D 13/06* (2013.01)

(58) Field of Classification Search
CPC ... F04D 3/00; F04D 7/04; F04D 7/045; F04D 29/18; F04D 29/185; F04D 29/70; F04D 29/708; C02F 1/34

USPC ................... 415/52.1, 54.1, 55.5, 115, 121.1
See application file for complete search history.

(56) References Cited

U.S. PATENT DOCUMENTS

| 5,324,177 | A * | 6/1994 | Golding | ................... F04D 1/04 |
| | | | | 415/900 |
| 5,531,564 | A * | 7/1996 | Anttonen | .................. F04D 1/06 |
| | | | | 415/104 |
| 6,227,797 | B1 * | 5/2001 | Watterson | ............. A61M 1/101 |
| | | | | 415/107 |
| 6,966,748 | B2 * | 11/2005 | Woodard | ................. F01D 25/22 |
| | | | | 415/104 |
| 2008/0031725 | A1 * | 2/2008 | LaRose | .................. A61M 1/101 |
| | | | | 415/104 |
| 2009/0220332 | A1 * | 9/2009 | Tsuchiya | ................. F01D 5/145 |
| | | | | 415/115 |
| 2009/0246022 | A1 * | 10/2009 | Huang | .................... F04D 1/063 |
| | | | | 416/68 |
| 2010/0098527 | A1 * | 4/2010 | Guemmer | ............. F04D 29/681 |
| | | | | 415/115 |
| 2011/0236178 | A1 * | 9/2011 | Devore | ..................... B22C 9/04 |
| | | | | 415/1 |

(Continued)

*Primary Examiner* — John Kwon
*Assistant Examiner* — Johnny H Hoang
(74) *Attorney, Agent, or Firm* — Nadya Reingand

(57) ABSTRACT

Provided is a cavitation pump unit. The cavitation pump unit includes a motor, a shaft axially mounted on a motor shaft, a plurality of impellers disposed at a predetermined distance along a circumferential surface of the shaft, and a housing surrounding the shaft and the plurality of impellers. The plurality of impellers includes cutter parts each of which protrudes to be inclined toward an inner surface of the housing in one direction, and cavitation grooves recessed inward in directions facing each other are defined in both side surfaces of each of the cutter parts.

7 Claims, 20 Drawing Sheets

(56) References Cited

U.S. PATENT DOCUMENTS

2016/0186758 A1\* 6/2016 Lopes ..................... F04D 9/002
　　　　　　　　　　　　　　　　　　　　　415/56.1

\* cited by examiner

CAVITATION PUMP UNIT

CROSS-REFERENCE TO RELATED APPLICATIONS

This U.S. non-provisional patent application claims priority under 35 U.S.C. § 119 of South Korean Patent Application No. 10-2017-0010777, filed on Jan. 24, 2017, the entire contents of which are hereby incorporated by reference.

BACKGROUND

The present invention relates to a cavitation pump unit, and more particularly, to a cavitation pump unit in which wastewater having high viscosity is introduced to pulverize, oxidize, and reduce the waste water and thereby to discharge the generated sludge in the form of homogeneous fine particles having no odor and no viscosity, thereby solving civil complaints with respect to odor, increasing a dehydration rate, reducing digestion efficiency, and significantly improving purification of the wastewater such as an increase in yield of a methane gas.

In general, the process of treating wastewater such as livestock manure with high viscosity may be divided into a physical treatment process using filtration, sedimentation, floatation separation, membrane separation, and ultraviolet rays, a chemical treatment process using reduction, flocculation, and adsorption methods, and a biological treatment process using microorganisms.

Of these, the biological treatment process is dominant in the process of treating livestock manure, which is commonly used.

In the biological treatment process, a food, a temperature, PH, dissolved oxygen, and the like of organic matters (microorganisms) may act as core factors for decomposing organic matters by using microorganisms. The dissolved oxygen of the core factors becomes an important factor in determining efficiency of the biological treatment process.

However, in the biological treatment process, since a blower and an oxidizer are used to supply oxygen, large power consumption is required for operating the blower, and thus, an oxygen saturation rate is low compared with the power consumption to make it economically disadvantageous.

Also, in the conventional biological treatment process, a predetermined space has to be secured due to the large equipment. In addition, since much cost is required for managing the equipment, there is a great economic burden for small-scale wastewater treatment.

Particularly, in case of wastewater having high viscosity such as livestock manure, when the wastewater is purified through the biological treatment process, there is a problem that the purification efficiency is poor.

PRIOR ART DOCUMENT

Patent Document

Korean Patent Publication No. 10-2016-014112 (Dec. 22, 2016)

SUMMARY

The present invention is made to solve the aforementioned problems, and a technical object to be solved by the present invention is to provide a cavitation pump unit which purifies sludge having high viscosity, which is generated in plants for treating wastewater or sewage having high viscosity because of containing a large amount of sludge such as livestock manure, through pulverization, oxidization, and reduction effects using a cavitation phenomenon to discharge sludge in the form of homogeneous fine particles having no odor and no viscosity and thereby to reduce economic burden in the wastewater treatment plant as well as solve civil complaints, increase a dehydration rate, reduce digestion efficiency, and increase yield of a methane gas, thereby easily purifying the wastewater to improve economic feasibility due to direct or indirect influences or effects thereof.

The objects of the present invention are not limited to the aforementioned object, but other objects not described herein will be clearly understood by those skilled in the art from descriptions below.

An embodiment of the present invention provides a cavitation pump unit including: a motor; a shaft axially mounted on a motor shaft; a plurality of impellers disposed at a predetermined distance along a circumferential surface of the shaft; and a housing surrounding the shaft and the plurality of impellers, wherein the plurality of impellers include cutter parts each of which protrudes to be inclined toward an inner surface of the housing in one direction, and cavitation grooves recessed inward in directions facing each other are defined in both side surfaces of each of the cutter parts.

When viewed in a plane, each of the cutter parts may include: a first side surface defined on one side surface of a top surface thereof and having a linear shape; a second side surface defined on the other side surface of the top surface thereof and having a linear shape by a predetermined length from a portion thereof having a high height to a portion thereof having a low height; and a third side surface having an inclined surface with a width that gradually decreases from an end of the second side surface to the portion having the low height.

Each of the top surface and the second side surface may have a diamond shape, and each of the first side surface and the third side surface may have a triangular shape.

The cavitation grooves recessed inward in the directions facing each other may be defined in the first side surface and the second side surface, respectively.

A surface of the cutter part facing the inner surface of the housing may be provided as a flat planar portion.

A plurality of seating recess portions may be defined in a circumferential surface of the shaft in a longitudinal direction, and the plurality of impellers may be fixedly mounted over a circumference of each of the plurality of seating recess portions.

Particularities of other embodiments are included in the detailed description and drawings.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 11 is an enlarged cross-sectional view illustrating a main part of

FIG. 10,

DETAILED DESCRIPTION

Figure 1:
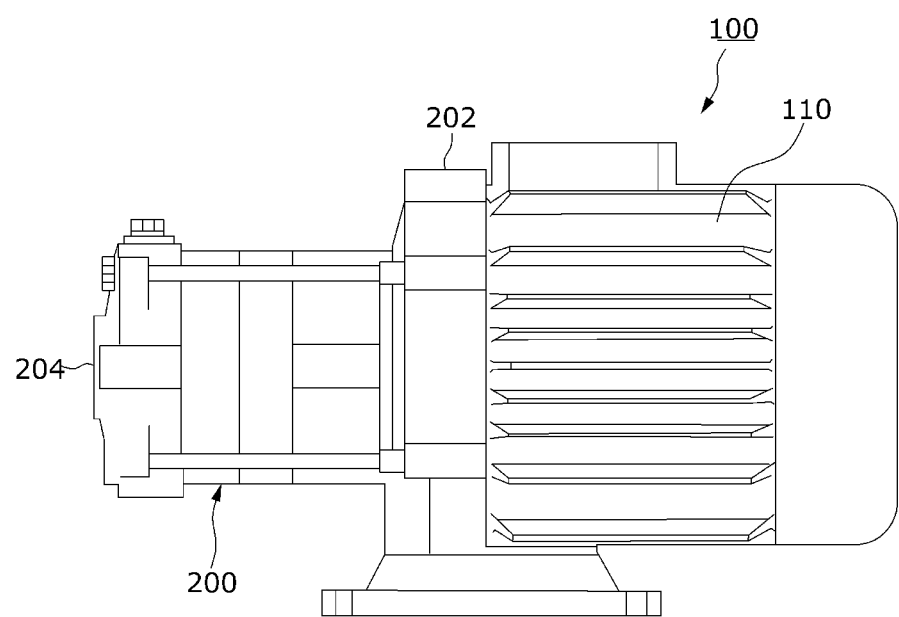
FIG. 1 is a front view illustrating an outer appearance of a cavitation pump unit according to embodiments of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Accordingly, in some embodiments, well-known processes, well-known device structures, and well-known techniques will not be described in detail to avoid ambiguous interpretation of the present invention.

In the following description, the technical terms are used only for explaining a specific exemplary embodiment while not limiting the present invention. In this specification, the terms of a singular form may include plural forms unless specifically mentioned. The meaning of 'comprises' and/or 'comprising' specifies a component, a step, an operation and/or an element does not exclude other components, steps, operations and/or elements. As used herein, the term "and/or" includes any and all combinations of one or more of the associated listed items.

Additionally, the embodiment in the detailed description will be described with reference to perspective views, sectional views, side views, and/or schematic views as ideal exemplary views of the present invention. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. Also, in the drawings illustrated in the embodiments of the present invention, the dimension of each component is exaggerated, omitted, or schematically illustrated for convenience in description and clarity.

Hereinafter, a cavitation pump unit according to exemplary embodiments of the present invention will be described in detail with reference to the accompanying drawings.

FIG. 1 is a front view illustrating an outer appearance of a cavitation pump unit according to embodiments of the present invention.

Referring to FIG. 1, a cavitation pump unit 100 according to embodiments of the present invention may include a motor 110 receiving an electric signal to provide driving force and a pumping part 200 which rotates by the motor 110 to pulverize, oxidize, and reduce introduced wastewater and thereby to divide the wastewater into liquid and sludge so as to purify the wastewater.

Here, the pumping part 200 may have one side in which an inflow hole 202 for introducing the wastewater is defined and the other side in which a discharge hole 204 is defined.

The pumping part 200 may vary in diameter and length according to capacity of the cavitation pump unit and thus may not be limited to diameter and length thereof.

First Embodiment

Figure 2:
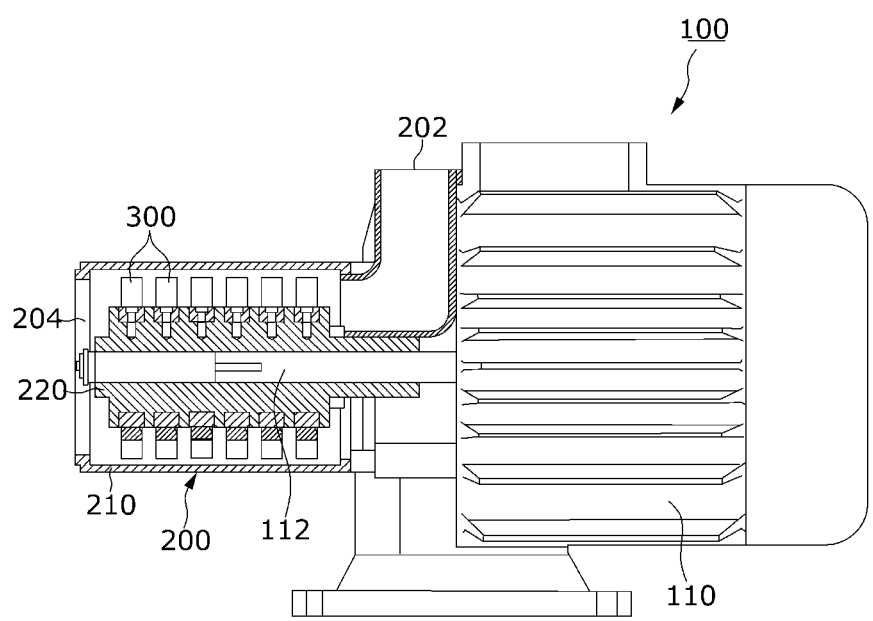
FIG. 2 is a partial cross-sectional view illustrating inner constituents of a cavitation pump unit according to a first embodiment of the present invention.
Figure 3:
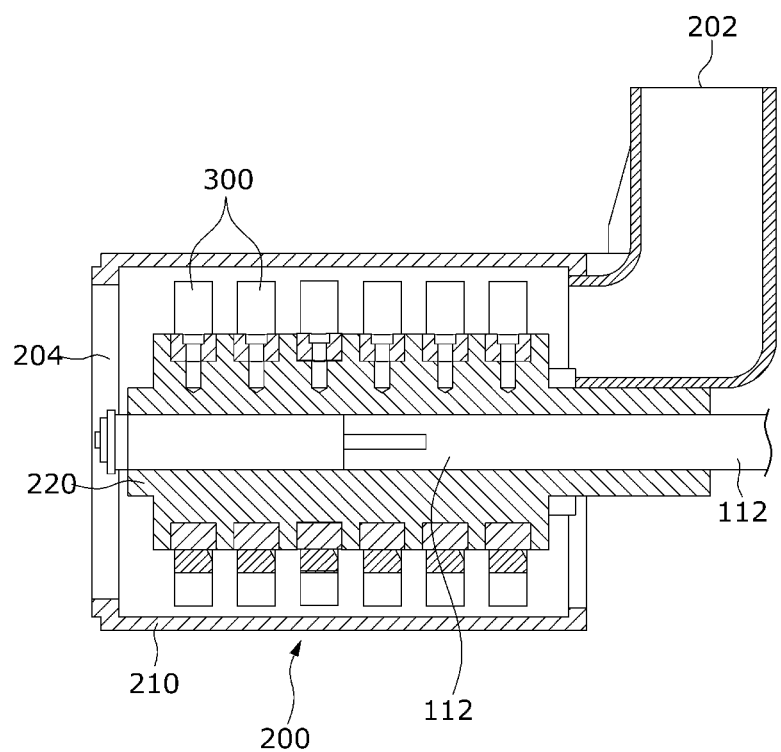
FIG. 3 is an enlarged cross-sectional view illustrating a main part of FIG. 2.
Figure 4:
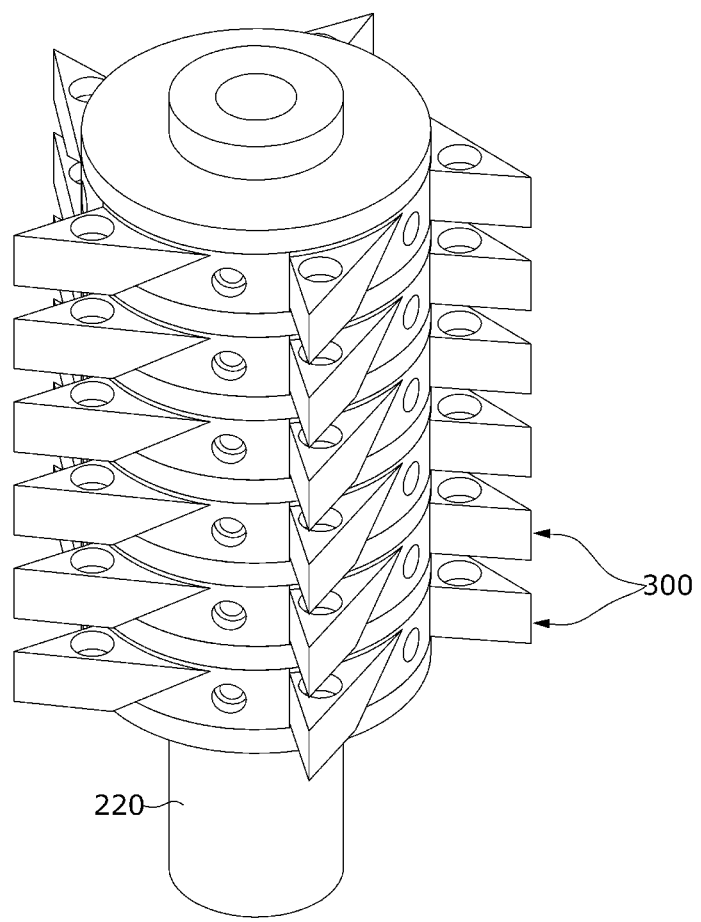
FIG. 4 is a perspective view illustrating a state in which an impeller is mounted on a shaft in the cavitation pump unit according to the first embodiment of the present invention.

FIG. 2 is a partial cross-sectional view illustrating inner constituents of a cavitation pump unit according to a first embodiment of the present invention, FIG. 3 is an enlarged cross-sectional view illustrating a main part of FIG. 2, and FIG. 4 is a perspective view illustrating a state in which an impeller is mounted on a shaft in the cavitation pump unit according to the first embodiment of the present invention.

Figure 5:
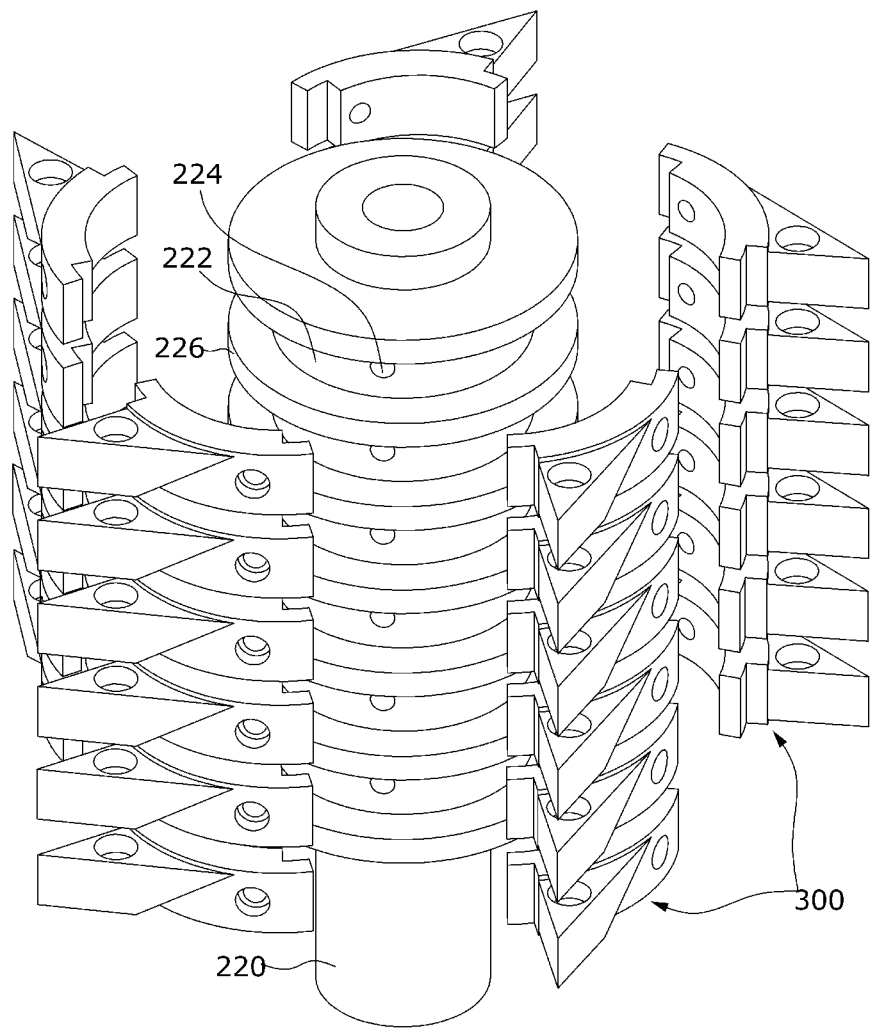
FIG. 5 is an exploded perspective view of FIG. 4.
Figure 6:
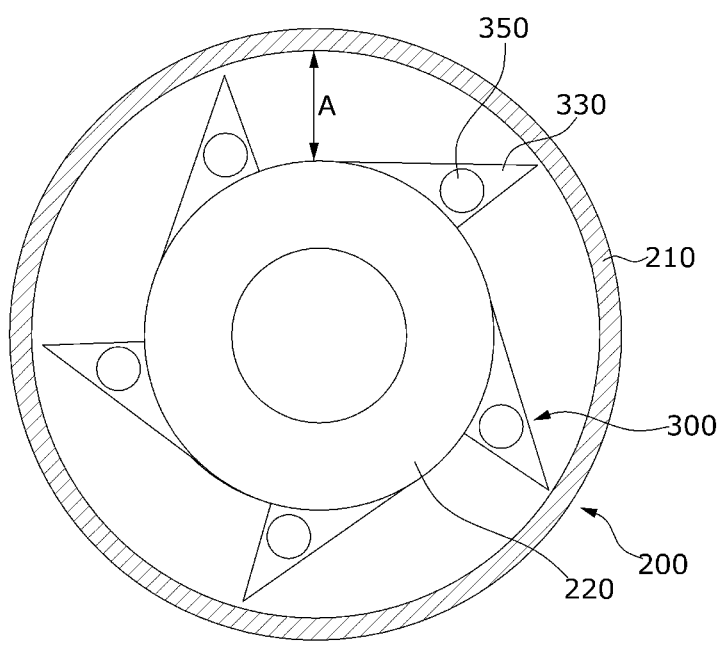
FIG. 6 is a front view illustrating a state in which the shaft and the impeller of FIG. 4 are disposed in a housing.
Figure 7A:
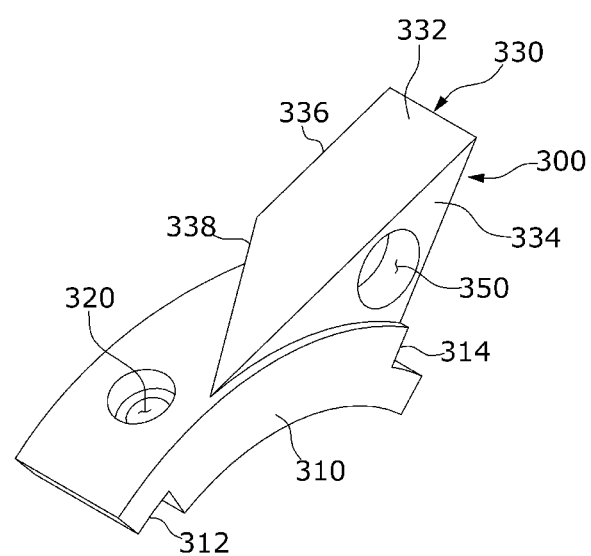
FIGS. 7A and 7B are perspective views of the impeller applied to the cavitation pump unit according to the first embodiment of the present invention.
Figure 7B:
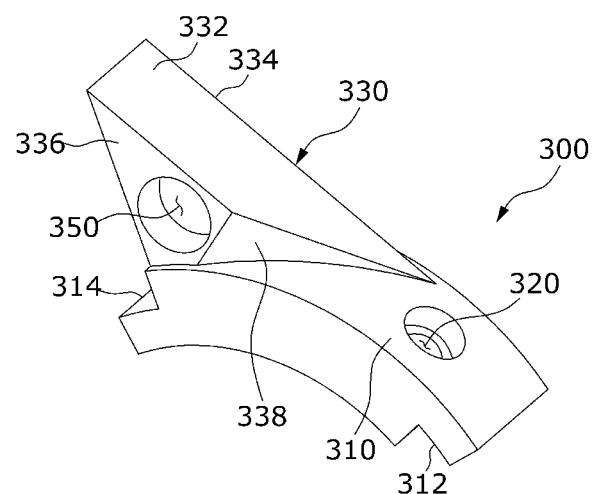

Also, FIG. 5 is an exploded perspective view of FIG. 4, FIG. 6 is a front view illustrating a state in which the shaft and the impeller of FIG. 4 are disposed in a housing, and FIGS. 7A and 7B are perspective views of the impeller applied to the cavitation pump unit according to the first embodiment of the present invention.

Figure 8:
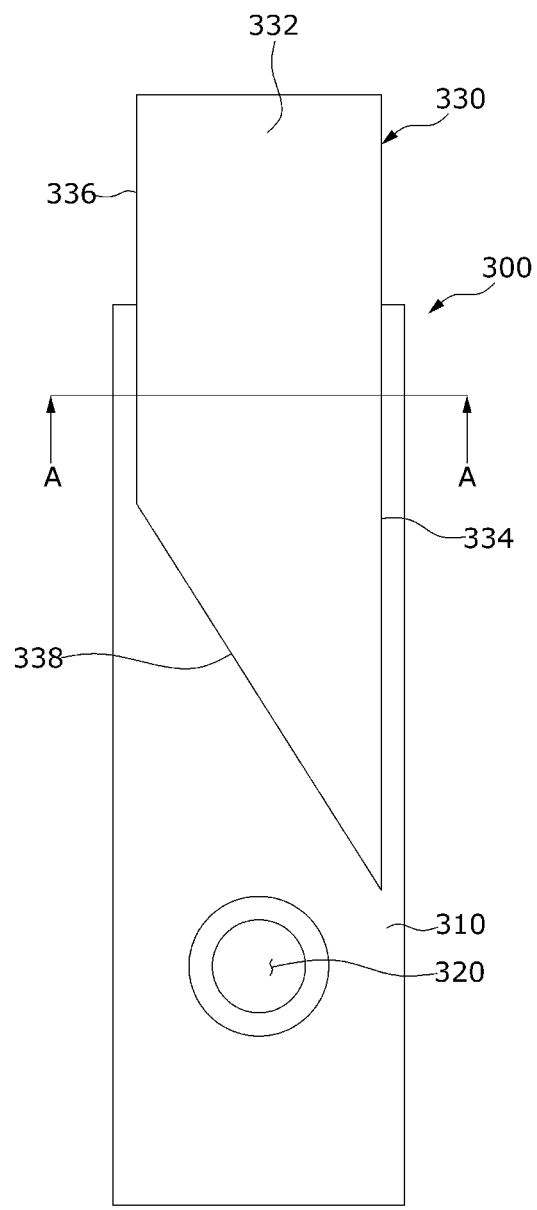
FIG. 8 is a plan view of FIG. 7.
Figure 9:
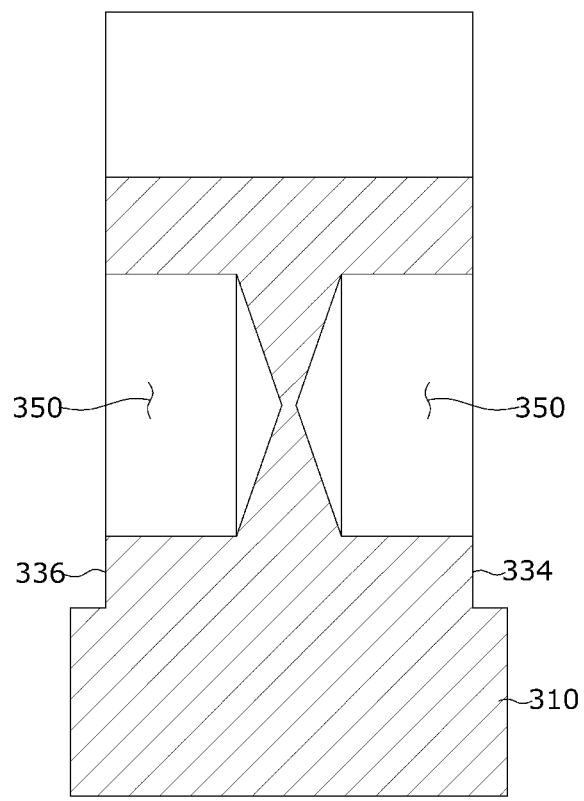
FIG. 9 is a cross-sectional view taken along line A-A' of FIG. 8.

Also, FIG. 8 is a plan view of FIG. 7, and FIG. 9 is a cross-sectional view taken along line A-A' of FIG. 8.

First, as illustrated in FIGS. 2 and 3, a cavitation pump unit 100 according to a first embodiment of the present invention may include a motor 110 receiving an electric signal to provide driving force and a pumping part 200 which is axially mounted on a shaft of the motor 110 to rotate so as to pulverize, oxidize, and reduce the introduced wastewater by using a cavitation phenomenon and then discharge the resultant wastewater to the outside.

Here, the pumping part 200 may have one side in which an inflow hole 202 for introducing the wastewater is defined and the other side in which a discharge hole 204 for discharging sludge having the form of powder, which is introduced through the inflow hole 202 and then is pulverized, oxidized, and reduced by the cavitation phenomenon, to the outside.

As illustrated in FIGS. 3 to 5, the pumping part 200 may include a shaft 220 having a shaft insertion hole in a center thereof so that the shaft of the motor 110 is axially mounted thereon and including a plurality of seating recess portions 222 at a predetermined distance along a circumference of an outer surface thereof, a plurality of impellers 300 installed around the seating recess portions 222 of the shaft 220, and a housing 210 disposed to be spaced a predetermined distance from ends of the plurality of impellers 300 to surround the shaft 220 and the impellers 300.

Here, a plurality of protrusion portions 226 may be disposed at a predetermined distance along the circumference of the outer surface of the shaft 220 to partition the plurality of seating recess portions 222.

In the cavitation pump unit 100 according to the first embodiment of the present invention, although six seating recess portions are defined in the circumference of the outer surface of the shaft 220, this is merely one example, and thus the first embodiment of the present invention is not limited thereto. For example, the number of seating recess portions 222 may vary according to capacity of the cavitation pump unit 100.

Also, referring to FIGS. 4 to 6, although five impellers 300 are mounted over the circumference of one seating recess portion 222 of the plurality of seating recess portions 222 disposed on the circumference of the outer surface of the shaft 220, this is merely one example, and thus, the first embodiment of the present invention is not limited thereto. For example, the impeller may vary in number and size according to the capacity of the cavitation pump unit 100.

Referring to FIGS. 7A and 7B, the impeller 300 applied to the cavitation pump unit 100 according to the first embodiment of the present invention may include a base part 310 seated on a portion of an area of each of the seating recess portions 222 of the shaft 220 and fixed and coupled to the shaft 220 by using a coupling member such as a bolt and a cutter part 330 protruding from a top surface 332 of the base part 310.

The base part 310 of the impeller 300 may be rounded to be seated on the seating recess portion 222 disposed on the circumference of the outer surface of the shaft 220.

Here, according to the first embodiment of the present invention, when the five impellers 300 are disposed on the one seating recess portion 222 disposed on the circumference of the outer surface of the shaft 220, each of the impeller 300 may be rounded at an angle of about 72 degrees.

Also, the base part 310 of the impeller 300 may have one end having a first stepped portion of which a portion of a lower portion is recessed inward and the other end having a second stepped portion of which a portion of an upper portion is recessed inward so that the impellers 300 adjacent to each other are stacked to be connected to each other. As a result, the impellers 300 may be stably seated around the circumference of the seating recess portion 222 of the shaft 220.

Here, a coupling hole 320 may be longitudinally defined in one side of the base part 310 of the impeller 300. The coupling member may be inserted through the coupling hole 320 to couple the impeller 300 to the shaft 220.

Thus, the number of coupling holes 224 corresponding to the number of impellers 300 may be defined in the seating recess portion 222 of the shaft 220.

The cutter part 330 may protrude from the top surface 332 of the base part 310. Referring again to FIGS. 7 to 9, the cutter part 330 may have a shape that gradually inclinedly increases in height from one side to the other side thereof.

Here, when viewed in the plane, the cutter part 330 may have one side surface of the top surface 332, which has a linear shape, and the other side surface of the top surface 332, which has a linear shape by a predetermined length from a portion thereof having a high height to a portion thereof having a low height and then has an inclined shape having a width that gradually decreases to the portion having the low height thereof. As illustrated in FIG. 8, the top surface 332 of the cutter part 330 may have an approximately diamond shape.

Also, a first side surface 334 defined on the one side surface and having the linear shape may have a triangular shape, and a second side surface 336 defined on the other side surface and having the linear shape may have a rectangular diamond shape. When viewed in the plane from the second side surface 336 to the portion having the lowest height, a third side surface having the inclination may have a triangular shape.

Here, since the third side surface 338 varies in inclined angle according to a length of the second side surface 336, the inclined angle of the third side surface 338 may vary without being limited thereto.

Here, cavitation grooves 35, each of which is recessed by a predetermined depth in directions facing each other, may be defined in one side of the first side surface 334 and one side of the second side surface 336, respectively.

In the drawings for explaining the cavitation pump unit according to the first embodiment of the present invention, although each of the cavitation groove 350 has a circular shape, this is merely an example, and thus, the first embodiment of the present invention is not limited to the shape, size, and number of the cavitation groove 350. For example, the cavitation groove 350 may vary in shape, size, and number according to the capacity of the cavitation pump unit 100.

As illustrated in FIGS. 2 to 6, the impellers 300 including the above-described constituents may be installed along the circumference of each of the seating recess portions 222 of the shaft 220. Also, each of the impellers 300 installed on the shaft 200 may protrude to be inclined to one side in the rotation direction thereof.

Here, an end of the cutter part 330 of each of the impellers 300, i.e., an end of an edge having the highest height from the base part 310 may be disposed to be spaced a predetermined distance from an inner surface of the housing 210.

Thus, when an electrical signal is applied to the motor 110 to drive the motor 110, the shaft 220 on which the motor shaft 112 is axially mounted may interlocked to rotate. Thus, since the shaft 220 rotates, the impellers 300 installed at a predetermined distance on the circumferential surface of each of the seating recess portions 222 of the shaft 220 may also be interlocked to rotate.

Here, since the housing 210 does not rotate, the impellers 300 may rotate with respect to the fixed housing 210 to allow the wastewater having high viscosity, which is supplied between the inner surface of the housing 210 and the impellers 300, to be pulverized by the cutter parts 330 of the impellers 300. The operation relationship therebetween will be described as follows.

As described above, when the electrical signal is applied to the motor 110 to drive the motor 110, the shaft 220 on which the motor shaft 112 is axially mounted may interlocked to rotate. Thus, since the shaft 220 rotates, the impellers 300 installed at a predetermined distance on the circumferential surface of each of the seating recess portions 222 of the shaft 220 may also be interlocked to rotate.

Here, the wastewater having the high viscosity to be purified may be introduced through the inflow hole 202 of the pumping part 200 and then be introduced between the inner surface of the housing 210 and the impellers 300.

Thus, the wastewater introduced between the inner surface of the housing 210 and the impellers 300, i.e., the wastewater having the high viscosity may be mixed by centrifugal force of the rotating impellers 300 and thus be pulverized by the cutter parts 330 of the impellers 300.

That is, each of the cutter parts 330 of the impellers 300 may be inclined in one direction and thus has a shape like a cutter. Thus, sludge containing relatively large-sized particles may be pulverized by the cutter parts 330.

Here, a distance between the end of each of the cutter parts 330 of the impellers 300 and the inner surface of the housing 210 is narrow by a predetermined gap. Thus, the sludge passing through the gap may be pulverized by the cutter parts 330.

Also, the wastewater containing the sludge may move along the first side surface 334 and the third side surface 338 by the centrifugal force due to the rotation of the impellers 300 and then is introduced into the cavitation grooves 350, which are recessed from the first and second side surfaces 334 and 336 in the direction facing each other, and discharged again from the cavitation grooves 350. As a result, the wastewater may be oxidized and reduced by the cavitation phenomenon, and thus, bubbles may be generated from moisture contained in the wastewater to separate the sludge and the moisture from each other.

Also, since the plurality of impellers 300 rotate at a high speed, the concentrated sludge of the wastewater may increase in temperature (about 5,000 K) by frictional force and the cavitation bubbles and also be more finely pulverized by the physicochemical oxidization and reduction reaction to reduce the viscosity, thereby forming the homogeneous fine particles.

The solid organic material containing the sludge may be promoted in hydrolysis by the above-described effects to realize high purification performance.

Thus, the wastewater introduced through the inflow hole 202, i.e., the wastewater sludge having the high viscosity may be pulverized by the cutter parts 330 of the impellers 300, and also, the homogeneous fine particles of the sludge, which are formed through the cavitation reaction by the cavitation grooves 350, may be promoted in hydrolysis due to solubility thereof. Thus, various organic materials contained in the wastewater sludge may be purified and reduced in weight. Therefore, the homogeneous sludge having the no odor and no viscosity, which is discharged through the discharge hole 204, may be improved in digestion efficiency to reduce a residence time in a digestion bath and increase in yield of a methane gas.

Also, the homogeneous sludge may have no odor and a high solid/liquid separation dehydration rate to improve the sludge reduction rate.

As described above, in the cavitation pump unit 100 according to the first embodiment of the present invention, the wastewater having the high viscosity such as the livestock manure or the sludge generated in the sewage treatment plants may be easily divided into the sludge and the moisture through the solid/liquid separation by the pulverization, the oxidization, and the reduction to discharge the homogeneous sludge, which is improved in dehydration rate and has the form of the fine particles. As a result, the wastewater having the high viscosity may be significantly improved in purification efficiency without installing the expensive equipment in a predetermined space of the existing wastewater, livestock manure, and sewage treatment plants to obtain significant economic benefits.

For reference, in the cavitation pump unit 100 according to the first embodiment of the present invention, although the wastewater having the high viscosity such as the livestock manure or the sludge generated in the sewage treatment plants is treated, this is merely one example, and thus, the first embodiment of the present invention is not limited thereto. For example, the cavitation pump unit 100 may be applied to purify various wastewater containing sludge such as various domestic sewage and industrial sewage.

In the cavitation pump unit 100 according to the first embodiment of the present invention, although the pumping part 200 has one side in which the inflow hole 202 is defined and the other side in which the discharge hole 204 is defined, and thus, the sludge having the form of the homogeneous fine particles and having no odor and no viscosity is discharged, the first embodiment of the present invention is not limited thereto. For example, the wastewater may be introduced through the discharge hole 204 by changing the rotation direction of the motor 110 to discharge the sludge having the form of the homogeneous fine particles and having no odor and no viscosity through the inflow hole 202.

Second Embodiment

Figure 10:
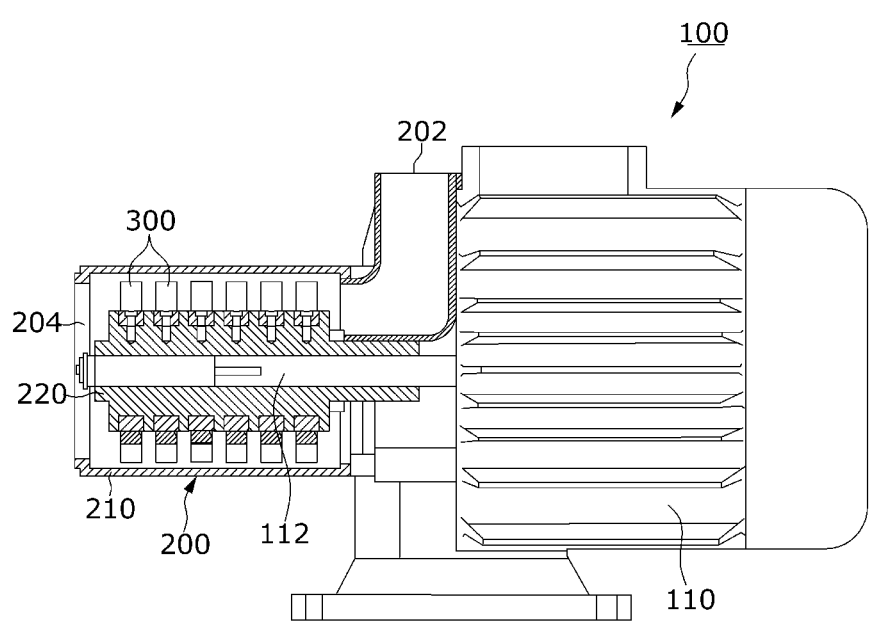
FIG. 10 is a partial cross-sectional view illustrating inner constituents of a cavitation pump unit according to a second embodiment of the present invention.
Figure 11:
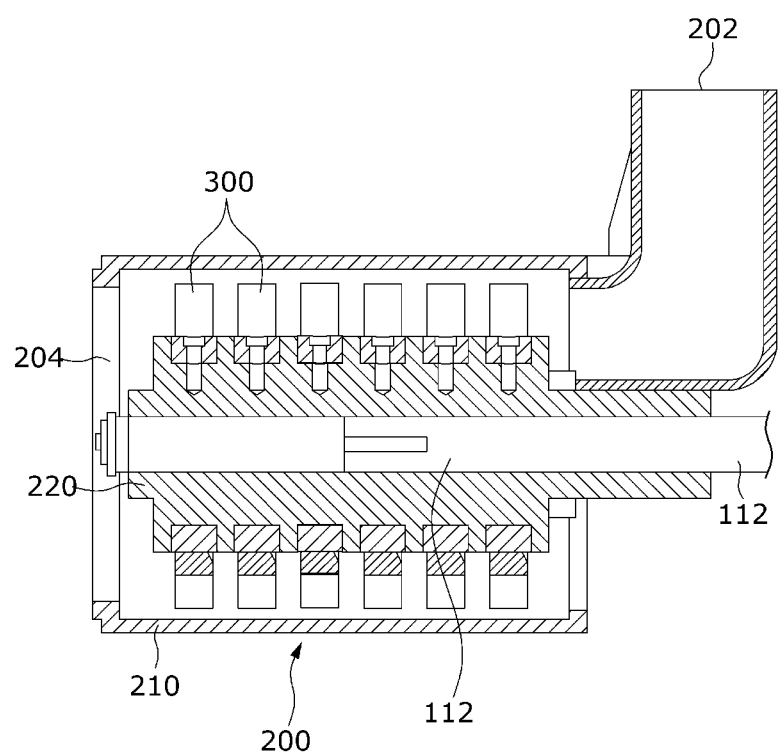
Figure 12:
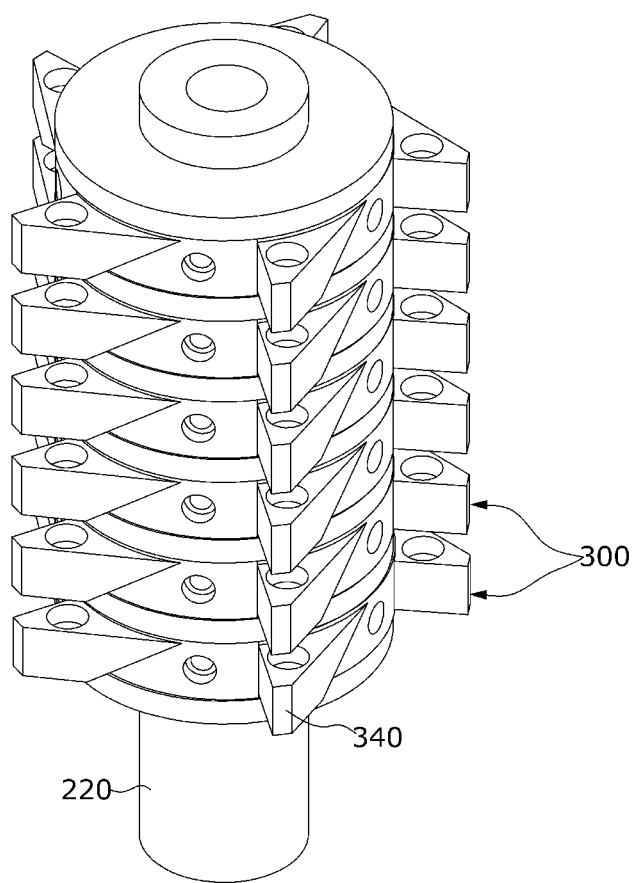
FIG. 12 is a perspective view illustrating a state in which an impeller is mounted on a shaft in the cavitation pump unit according to the second embodiment of the present invention.

FIG. 10 is a partial cross-sectional view illustrating inner constituents of a cavitation pump unit according to a second embodiment of the present invention, FIG. 11 is an enlarged cross-sectional view illustrating a main part of FIG. 10, and FIG. 12 is a perspective view illustrating a state in which an impeller is mounted on a shaft in the cavitation pump unit according to the second embodiment of the present invention.

Figure 13:
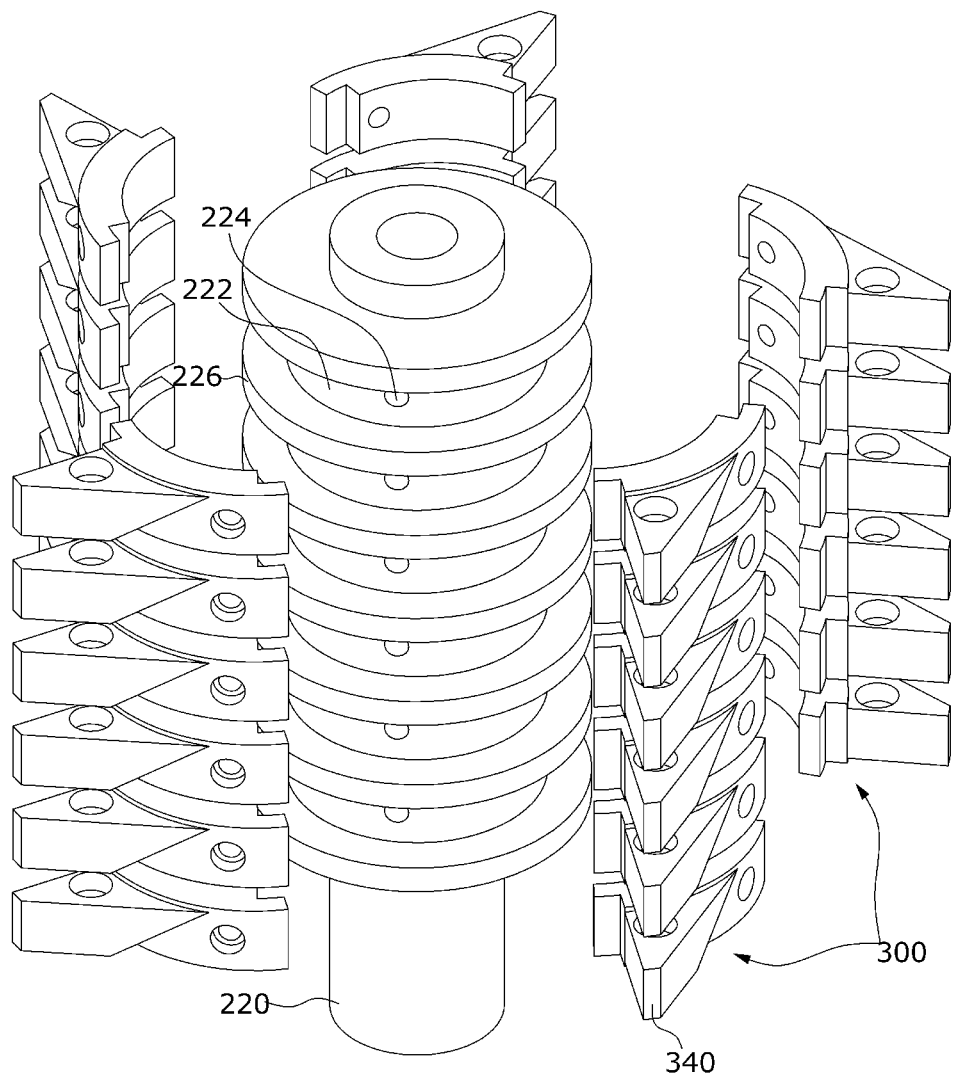
FIG. 13 is an exploded perspective view of FIG. 12.
Figure 14:
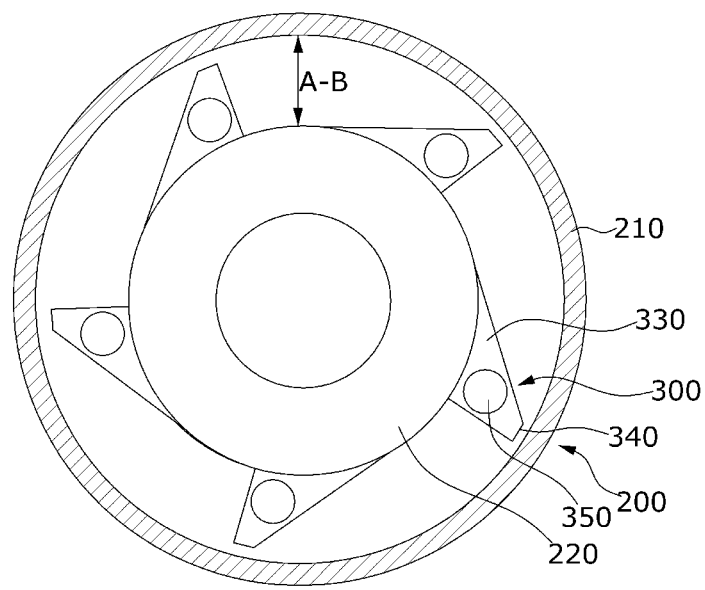
FIG. 14 is a front view illustrating a state in which the shaft and the impeller of FIG. 12 are disposed in a housing.
Figure 15A:
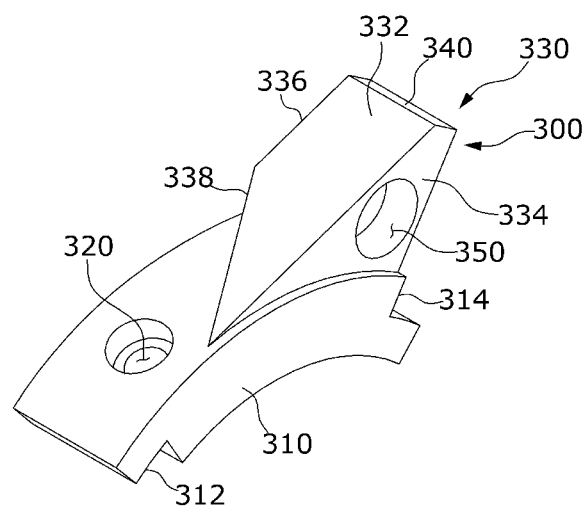
FIGS. 15A and 15B are perspective views of the impeller applied to the cavitation pump unit according to the second embodiment of the present invention.
Figure 15B:
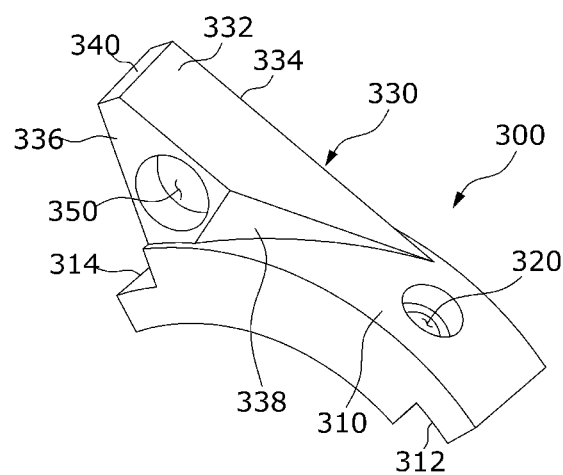

Also, FIG. 13 is an exploded perspective view of FIG. 12, FIG. 14 is a front view illustrating a state in which the shaft and the impeller of FIG. 12 are disposed in a housing, and FIGS. 15A and 15B are perspective views of the impeller applied to the cavitation pump unit according to the second embodiment of the present invention.

Figure 16:
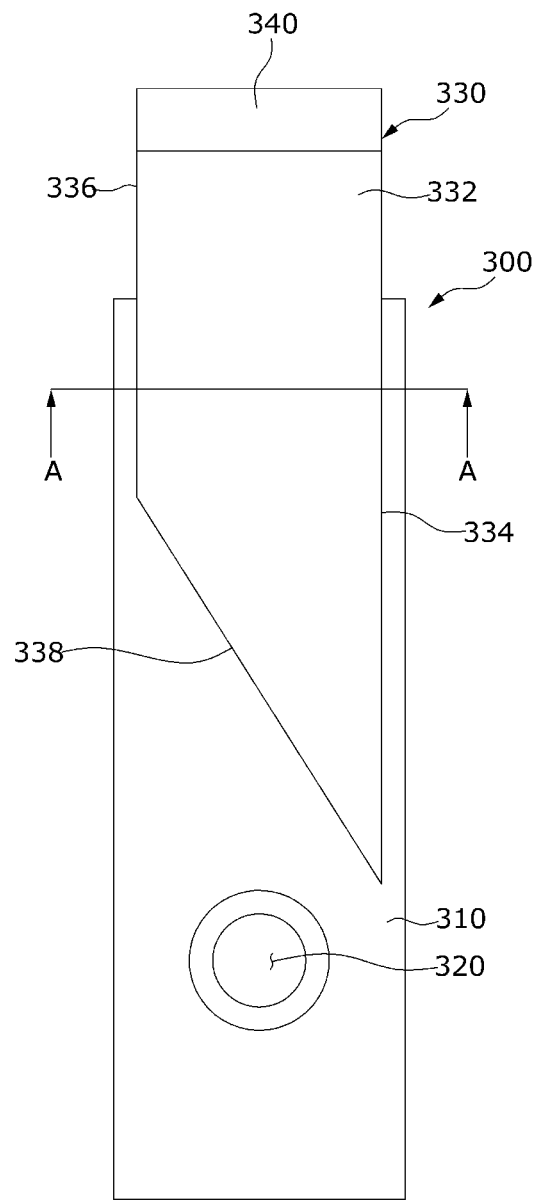
FIG. 16 is a plan view of FIG. 15.
Figure 17:
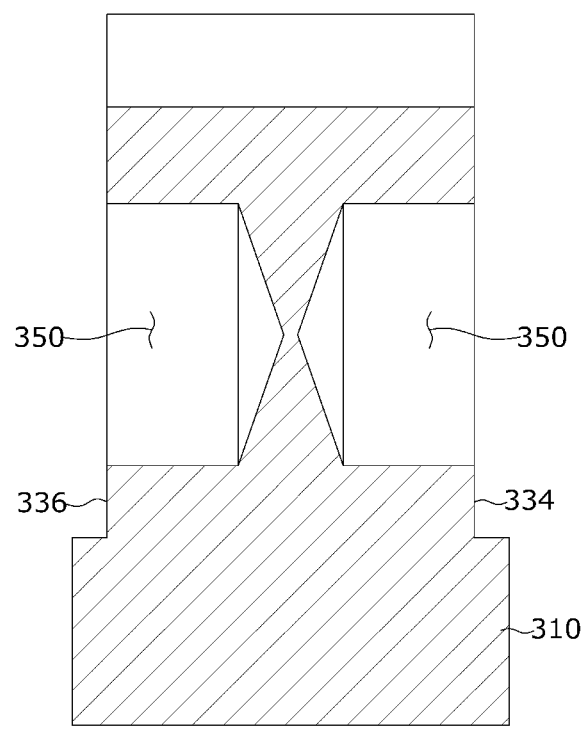
FIG. 17 is a cross-sectional view taken along line B-B' of FIG. 16.

Also, FIG. 16 is a plan view of FIG. 15, and FIG. 17 is a cross-sectional view taken along line B-B' of FIG. 16.

The cavitation pump unit according to the second embodiment of the present invention, which is described with reference to FIGS. 10 to 17, will be described by giving the same reference numeral to the same part as that of the cavitation pump unit according to the first embodiment of the present invention.

Referring to FIGS. 10 to 17, a cavitation pump unit 100 according to a second embodiment of the present invention may be the same as the cavitation pump unit according to the first embodiment except that a cutter part 330 of an impeller 300 has a flat end to form a planar portion.

As described above, when the cutter part 330 of the impeller 300 has the flat end to form the planar portion 340, a contact area between the cutter part 330 of the impeller 300 and wastewater introduced through an inflow hole 202 may increase to more improve a cavitation effect.

Also, referring to FIG. 14, since the end of the cutter part 330 of the impeller 300 is provided as the planar portion 340, a housing 210 may be reduced in inner diameter. Thus, a distance (A-B) between an outer surface of a shaft 220 and an inner surface of the housing 210 may be reduced to more improve the cavitation effect.

That is, since the end of the cutter part 330 of the impeller 300 is provided as the flat planar portion 340 to reduce the inner diameter of the housing 210, the distance between the outer surface of the shaft 220 and the inner surface of the housing 210 may be reduced to allow the wastewater to increase in flow rate, thereby more improving the cavitation effect.

As described above, since the cavitation pump unit 100 according to the second embodiment of the present invention has the same constituent and operation as those of the cavitation pump unit according to the foregoing first embodiment of the present invention except that the end of the cutter part 330 of the impeller 300 is provided as the flat planar portion 340, their duplicated description will be omitted.

Figure 18:
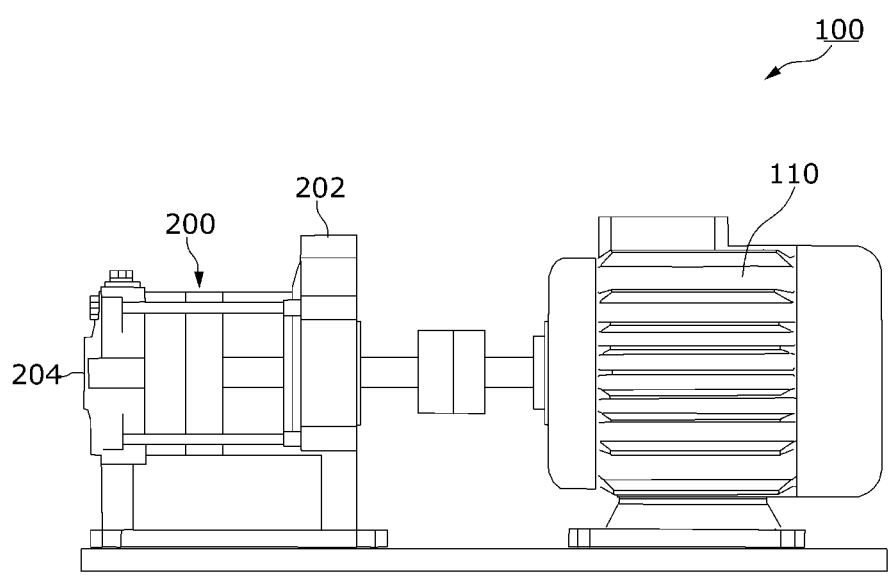
FIG. 18 is a front view illustrating a modified example of the cavitation pump unit according to the embodiments of the present invention.

For reference, FIG. 18 is a front view illustrating a modified example of the cavitation pump unit according to the embodiments of the present invention. When the cavitation pump unit has relatively large capacity, the pumping part 200 and the motor 110 may be disposed to be spaced a predetermined distance from each other. In this case, the impellers according to the foregoing embodiments may be applied to realize the same effect.

In the cavitation pump unit according to the embodiment of the present invention, since the wastewater having the high viscosity because of containing a large amount of sludge such as the livestock manure or sludge having the high viscosity, which is generated in the wastewater or sewage treatment plants, is purified by the pulverization, oxidization, and reduction effects using the cavitation phenomenon and thus discharged in the form of the homogeneous fine particles having no odor and no viscosity, the wastewater may be easily purified to directly or indirectly improve the economic feasibility such as the solution of the civil complaints, the increase of the dehydration rate, the reduction of the digestion efficiency, and the increase in yield of the methane gas without the economic burden.

The effects of the prevent invention are not limited by the aforementioned description, and thus, more varied effects are involved in this specification.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A cavitation pump unit comprising:
   a motor;
   an internal drive shaft axially mounted on a motor shaft, the internal drive shaft having a plurality of seating recess portions and a plurality of protrusion portions;
   a plurality of impellers disposed at a predetermined distance along a circumferential surface of the shaft along said seating recess portions and between said protrusion portions;
   a housing surrounding the shaft and the plurality of impellers;
   wherein each one of the plurality of impellers comprise cutter parts each of which protrudes to be inclined toward an inner surface of the housing in one direction, and
   wherein cavitation grooves recessed inward in directions facing each other are defined in both side surfaces of each of the cutter parts.

2. The cavitation pump unit of claim 1, wherein, when viewed in a plane, each of the cutter parts comprises:
   a first side surface defined on one side surface of a top surface thereof and having a linear shape;
   a second side surface defined on the other side surface of the top surface thereof and having a linear shape by a predetermined length from a portion thereof having a high height to a portion thereof having a low height; and
   a third surface having an inclined surface with a width that gradually decreases from an end of the second side surface to the portion having the low height.

3. The cavitation pump unit of claim 2, wherein each of the top surface and the second side surface has a diamond shape, and wherein each of the first side surface and the third side surface has a triangular shape.

4. The cavitation pump unit of claim 2, wherein the cavitation grooves recessed inward in the directions facing each other are defined in the first side surface and the second side surface, respectively.

5. The cavitation pump unit of claim 1, wherein a surface of the cutter part facing the inner surface of the housing is provided as a flat planar portion.

6. The cavitation pump unit of claim 1, wherein the plurality of seating recess portions is defined in a circumferential surface of the shaft in a longitudinal direction, and wherein the plurality of impellers is fixedly mounted over a circumference of each of the plurality of seating recess portions.

7. The cavitation pump unit of claim 1, wherein each impeller comprises one end having a first stepped portion of which a part of a lower portion is recessed inward and another end having a second stepped portion of which a part of an upper portion is recessed inward so that impellers adjacent to each other are stacked to be connected to each other.

* * * * *